United States Patent [19]
Hsu

[11] Patent Number: 6,006,559
[45] Date of Patent: Dec. 28, 1999

[54] LOCK FOR PREVENTING THEFT OF AUTOMOTIVE VEHICLE

[76] Inventor: Hung-Cheng Hsu, No. 726 Dong Kuang Road, North Tun Area, Taichung, Taiwan

[21] Appl. No.: 09/259,321

[22] Filed: Mar. 1, 1999

[51] Int. Cl.[6] .................................................. B60R 25/00
[52] U.S. Cl. ............................................... 70/202; 70/203
[58] Field of Search ............................. 70/198–203, 237, 70/238, 254

[56] References Cited

U.S. PATENT DOCUMENTS

| | | | |
|---|---|---|---|
| 3,898,823 | 8/1975 | Ludeman | 70/238 X |
| 4,333,326 | 6/1982 | Winters | 70/237 X |
| 5,282,373 | 2/1994 | Riccitelli | 70/238 X |
| 5,537,846 | 7/1996 | Simon | 70/237 X |
| 5,653,133 | 8/1997 | Passantino | 70/238 |
| 5,671,620 | 9/1997 | Carvey et al. | 70/238 |
| 5,689,981 | 11/1997 | DeLuca et al. | 70/237 X |
| 5,713,539 | 2/1998 | Russ et al. | 70/238 X |
| 5,715,710 | 2/1998 | DeLucia et al. | 70/237 X |
| 5,870,912 | 2/1999 | Vito | 70/237 X |
| 5,911,391 | 6/1999 | Russ et al. | 70/237 X |
| 5,911,765 | 6/1999 | DaSilva | 70/237 X |

*Primary Examiner*—Lloyd A. Gall
*Attorney, Agent, or Firm*—Browdy and Neimark

[57] ABSTRACT

A lock for preventing theft of an automotive vehicle consists essentially of a support seat, a carrying member, a tightening device, and a lock rod set. The support seat has a bottom seat and a hollow support rod mounted on the bottom seat. The carrying member has a carrying rod which is provided at the bottom end thereof with a receiving portion, a sleeve fastened with the top end of the carrying rod, an arresting block fastened with the midsegment of the carrying rod, and a locking device fastened at the top end of the carrying rod. The tightening device is disposed in the receiving portion of the support rod for fastening the carrying member with the support rod. The lock rod set is fitted into the sleeve and is composed of a lock rod having a shank which is provided at one end thereof with a toothed portion and a hooked block corresponding in location to the arresting block. The shank is further provided at other end thereof with a fastening member. One of the pedals of the automotive vehicle is disabled by the arresting block and the hooked block of the lock.

6 Claims, 7 Drawing Sheets

6,006,559

LOCK FOR PREVENTING THEFT OF AUTOMOTIVE VEHICLE

FIELD OF THE INVENTION

The present invention relates generally to a lock, and more particularly to a lock for preventing the theft of a motor vehicle.

BACKGROUND OF THE INVENTION

There are a variety of mechanical devices which are designed to prevent the theft of automotive vehicles. However, there are mainly two kinds of such mechanical devices, which are used to disable the steering wheel or the gear shift of an automotive vehicle. As shown in FIG. 1, a prior art mechanical device 1 is provided at one end thereof with a hook for catching the steering wheel 2, and at other end thereof with a hook for catching the brake pedal 3. Such a prior art mechanical device as described above is lengthy and inconvenient. The device must be used in such a manner that two component parts of a motor vehicle are disabled at the same time.

The conventional lock for disabling the gear shift of an automotive vehicle comprises a base and a rod. The body of the automotive vehicle must be so drilled as to enable the base of the lock to be fastened near the gear shift. The gear shift is disabled by being located between the base and the rod of the lock. The drilling job must be done at the body shop at additional expense, not to mention the trouble that the car owner has to take to make an appointment with the auto body shop for the drilling job.

SUMMARY OF THE INVENTION

The primary objective of the present invention is therefore to provide a lock which is simple in construction and is intended to prevent theft of a motor vehicle by disabling the brake pedal, the clutch pedal, or the accelerator pedal of the motor vehicle.

The lock embodied in the present invention is composed of a support seat, a carrying member, a tightening device, and a lock rod set. The support seat has a bottom seat and a hollow support rod mounted on the bottom seat. The carrying member has a carrying rod which is provided at the bottom end thereof with a receiving portion, a sleeve fastened with the top end of the carrying rod, an arresting block fastened with the midsegment of the carrying rod, and a locking device fastened at the top end of the carrying rod. The tightening device is disposed in the receiving portion of the support rod for fastening the carrying member with the support rod. The lock rod set is fitted into the sleeve and is composed of a lock rod having a shank which is provided at one end thereof with a toothed portion and a hooked block corresponding in location to the arresting block. The shank is further provided at other end thereof with a fastening member. One of the pedals of a motor vehicle is disabled by the arresting block and the hooked block of the lock of the present invention.

The foregoing objective, features and functions of the present invention will be more readily understood upon a thoughtful deliberation of the following detailed description of the embodiments of the present invention with reference to the accompanying drawings.

DETAILED DESCRIPTION OF THE INVENTION

Figure 1:
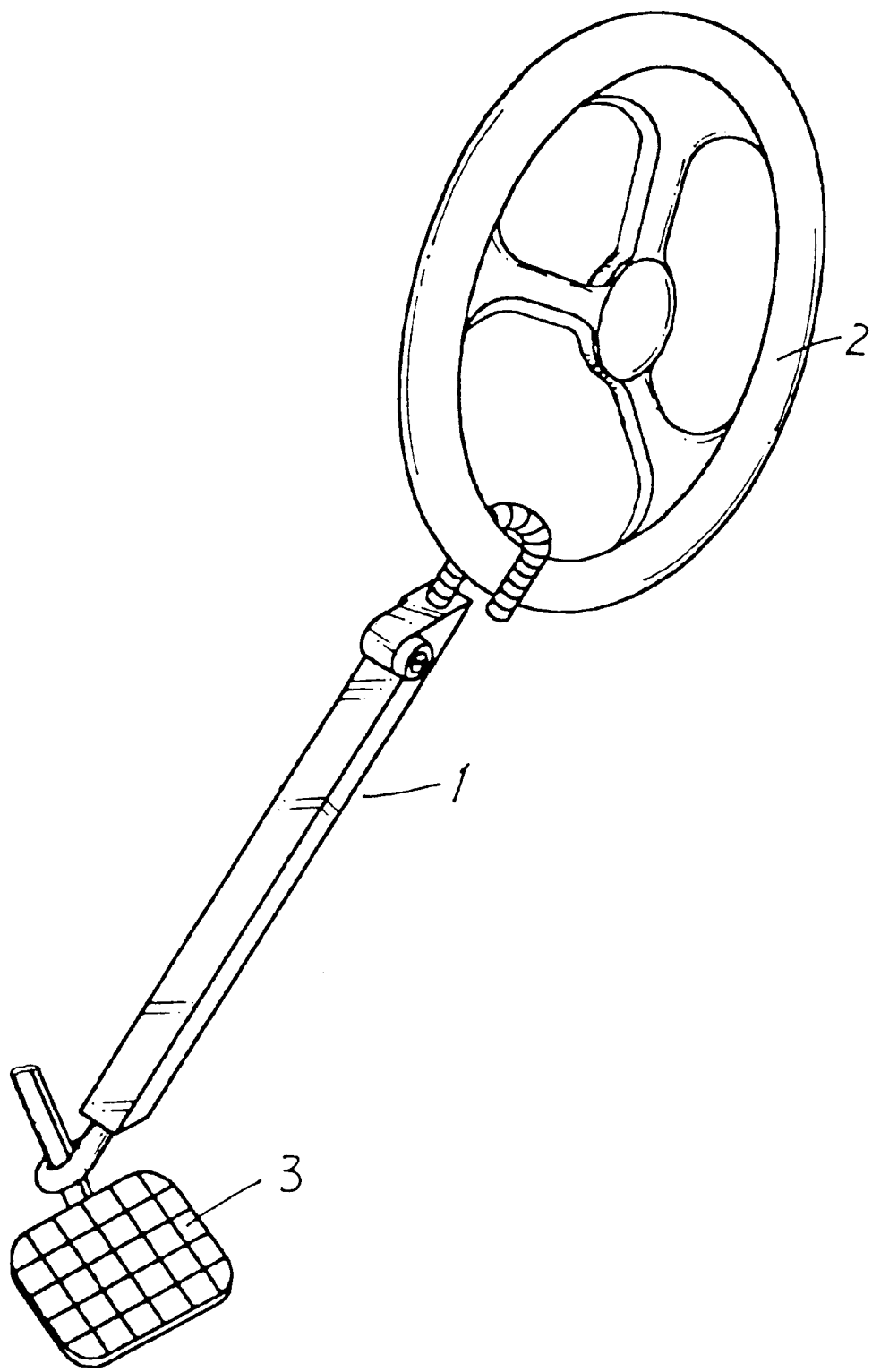
FIG. 1 shows a schematic view of a so-called crutch lock of the prior art at work.
Figure 2:
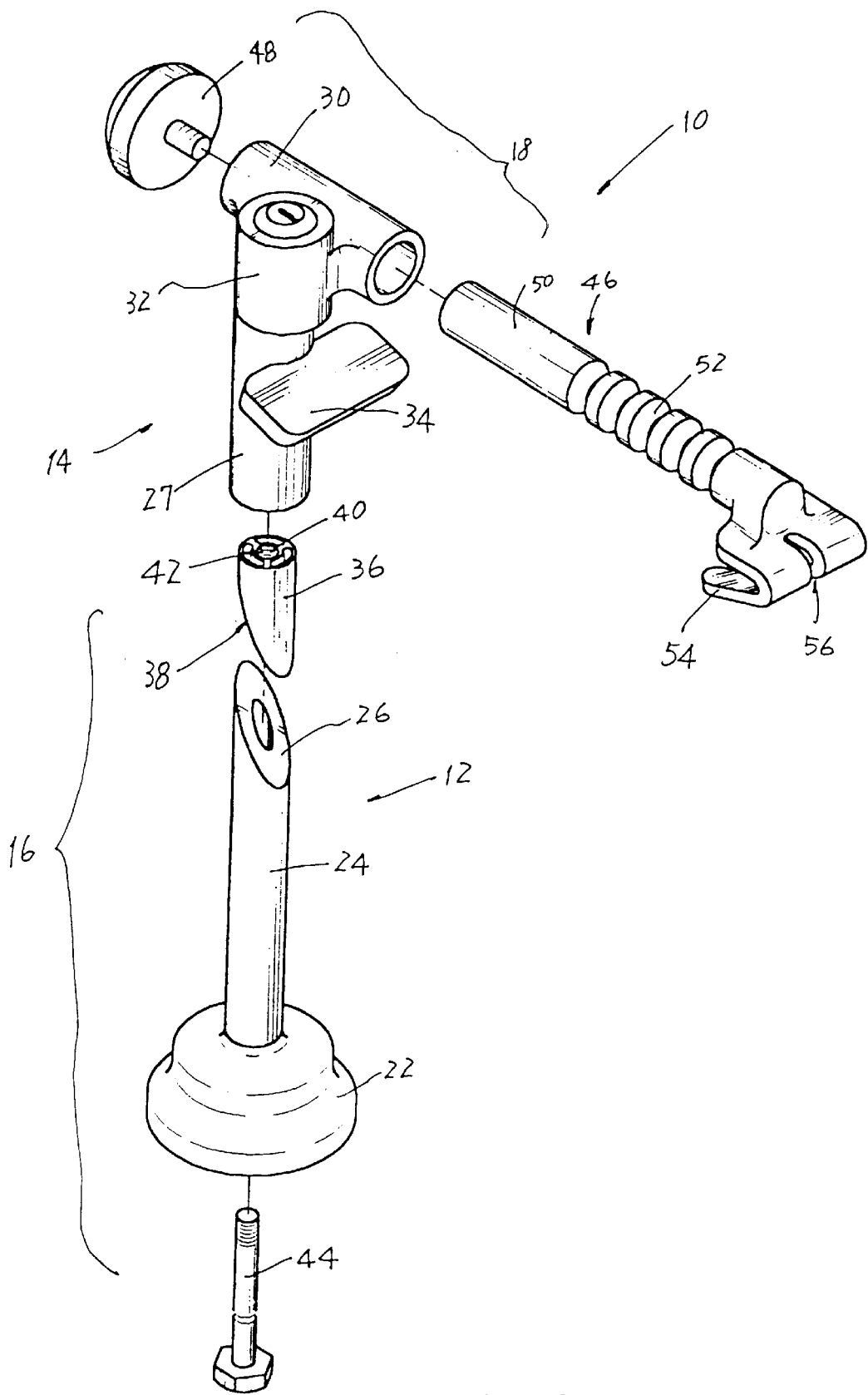
FIG. 2 shows an exploded view of a first preferred embodiment of the present invention.
Figure 3:
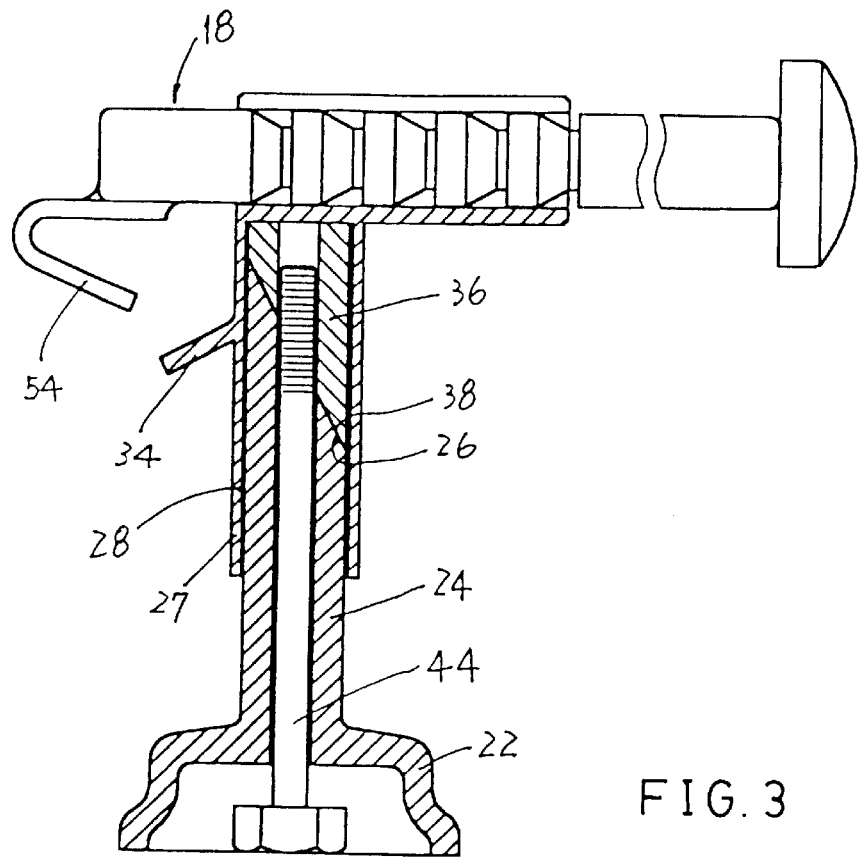
FIG. 3 shows a sectional view of the first preferred embodiment of the present invention in combination.

As shown in FIG. 2, a lock 10 of the first preferred embodiment of the present invention comprises a support seat 12, a carrying member 14, a tightening device 16, and a lock rod set 18.

The support seat 12 is provided with a bottom seat 22 of a hollow construction and having an opening facing downward, and a hollow support rod 24 which is formed integrally at the axial position of the top side of the bottom seat 22 such that the inner portion of the support rod 24 is in communication with the bottom portion of the bottom seat 22. The support rod 24 is provided at the top thereof with a contact surface 26 which has an inclination relative to the axial direction.

The carrying member 14 is provided with a hollow carrying rod 27 of a length, a receiving portion 28 with an inner diameter slightly greater than an outer diameter of the support rod 24, a sleeve 30 formed integrally at the top end of the carrying rod 27 such that the axis of the sleeve 30 is perpendicular to the carrying rod 27, a locking device 32 fastened with one side of the sleeve 30, and an arresting block 34 fastened with the carrying rod 27 such that the arresting block 34 is corresponding in location to one end of the sleeve 30. The carrying member 14 is engaged with the support rod 24 such that the carrying rod 27 is fitted over the support rod 24.

The tightening device 16 has a plug block 36 which is of a hollow construction and is disposed in the receiving portion 28. The plug block 28 is provided at the bottom thereof with a second contact surface 38 in contact with the first contact surface 26 in a complementary manner. The plug block 36 is provided in the inner side thereof with a tubular fastening portion 40 which is fastened integrally therewith and is provided therein with threads 42 that are engaged with a fastening bolt 44 received in the support rod 24. The tightening device 16 is used to connect the support seat 12 with the carrying member 14 in such a manner that the carrying member 14 can be adjusted in height relative to the support seat 12. The plug block 36 may be hollow or solid.

The lock rod set 18 is fitted into the sleeve 30 and is formed of a lock rod 46 and a lock member 48. The lock rod 46 has a shank 50, a toothed portion 52 located at one end of the shank 50, and a hooked block 54 fastened at the outer end of the toothed portion 52 such that the hooked block 54 is corresponding in location to the arresting block 34. The hooked block 54 is provided with a retaining slot 56. The lock member 48 is engaged with other end of the shank 50 for preventing the lock rod 46 from slipping out of the sleeve 30.

Figure 4:
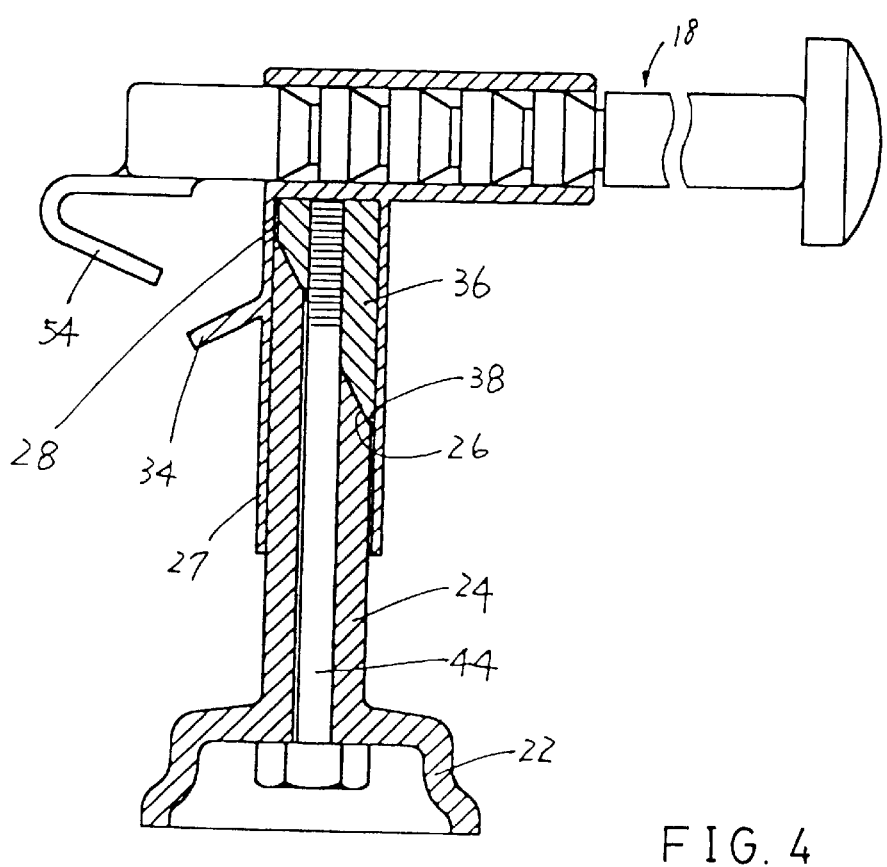
FIG. 4 is a schematic view to show the connection of the tightening device with the support seat and the carrying member of the first preferred embodiment of the present invention in action.
Figure 5:
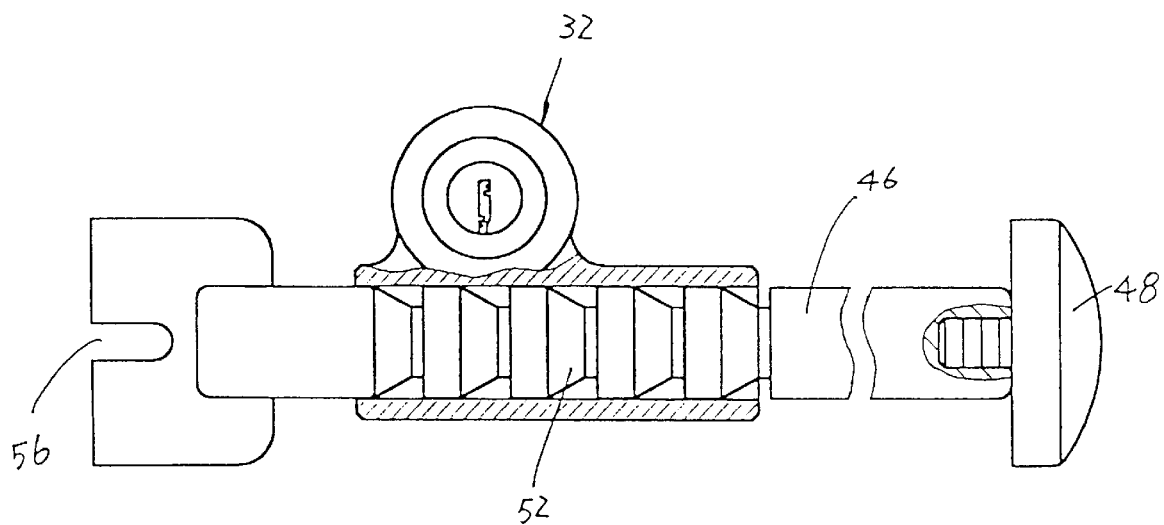
FIGS. 5 and 6 are schematic views to show the locking device in action to lock the lock rod set of the first preferred embodiment of the present invention.
Figure 6:
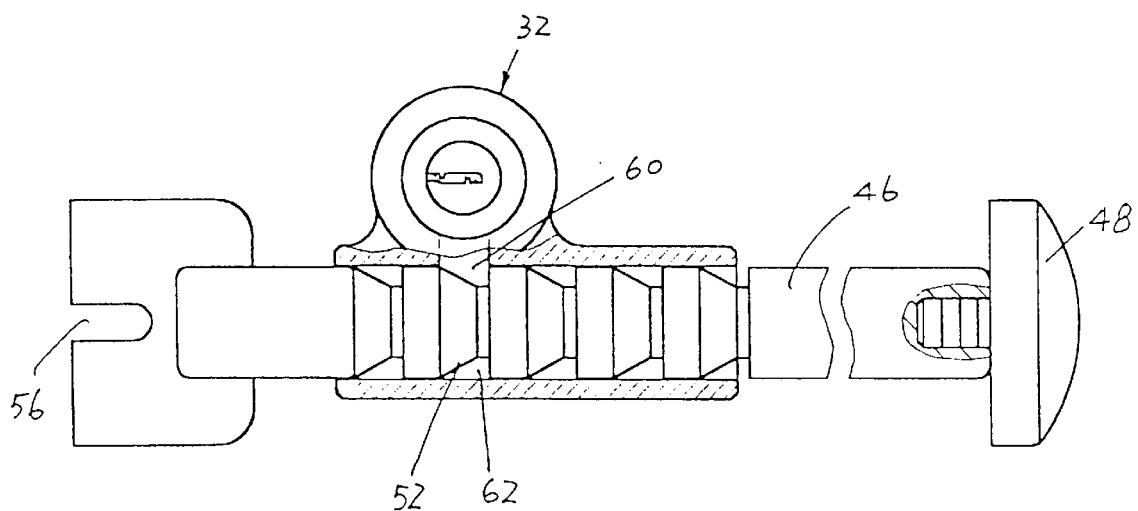
Figure 7:
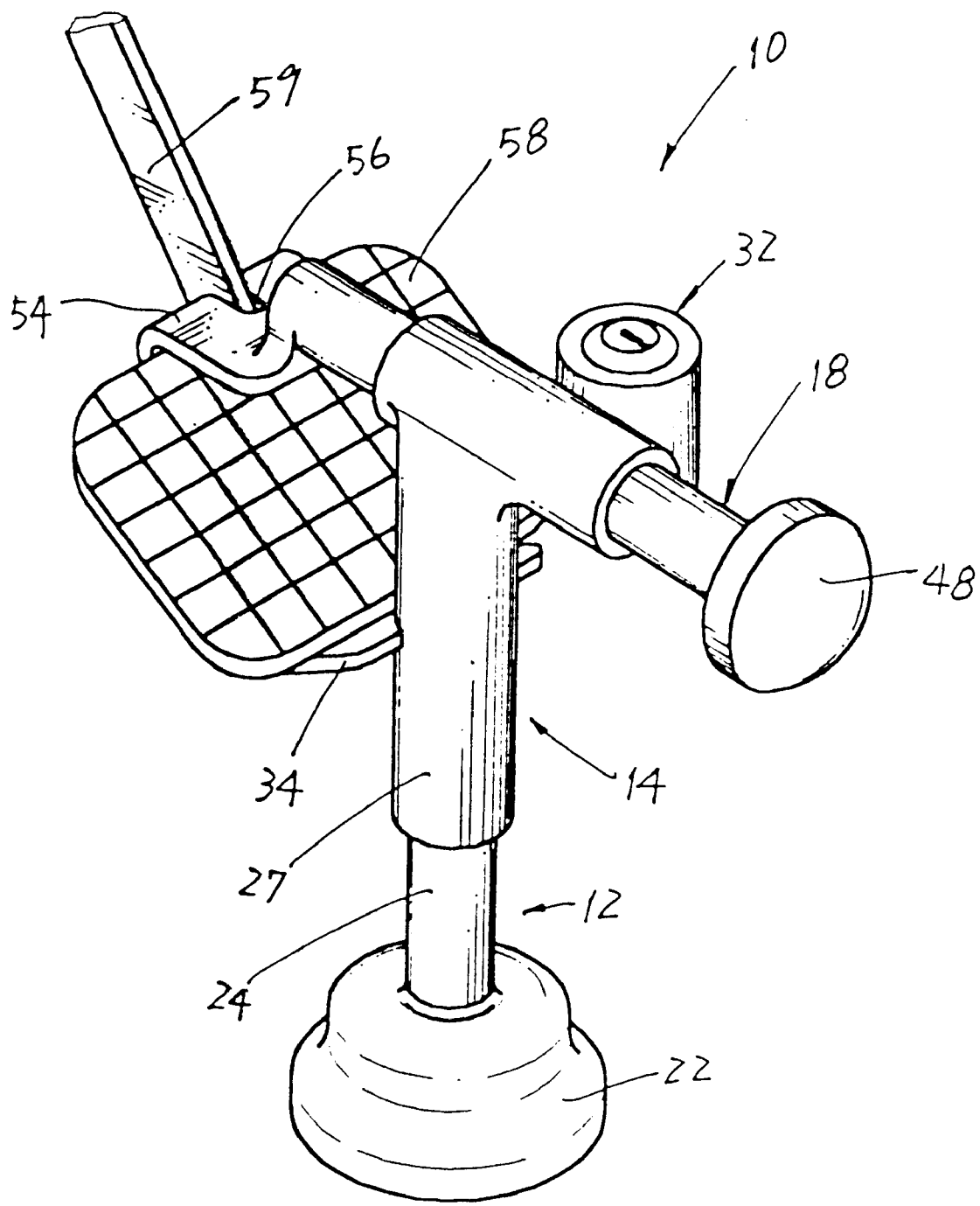
FIG. 7 shows a schematic view of the first preferred embodiment of the present invention at work.

The lock 10 of the present invention is intended to prevent the theft of an automotive vehicle by disabling the brake pedal, the clutch pedal, or the accelerator pedal of the automotive vehicle. As shown in FIGS. 3–7, the lock 10 of the present invention is used to disable a brake pedal 58 of the automotive vehicle. In operation, the lock 10 is first disposed under the brake pedal 58 before the carrying member 14 is raised such that the arresting block 34 is in contact with a front end of the brake pedal 58. The fastening bolt 44 is then engaged with the threaded hole (portion) 40 of the plug block 36, thereby causing the second contact surface 38 of the plug block 36 to make contact with the first contact surface 26 of the support rod 24. As the fastening bolt 44 is tightened, the plug block 36 displaces downward along the first contact surface 26 of the support rod 24. In the meantime, the plug block 36 is pushed by the support rod 24 to displace toward the inner wall of the carrying rod 27 such that both plug block 36 and the support rod 24 are securely disposed in the carrying rod 27, as shown in FIG. 4. As a result, the carrying member 14 is fastened securely with the support seat 12. Thereafter, the lock rod 46 is located at a rear end of the brake pedal 58 such that the retaining slot 56 of the hooked block 54 of the lock rod 46 is corresponding in location to a connection rod 59 of the brake pedal 58, and that the underside of the front end of the brake pedal 58 is stopped by the arresting block 34. The top edge of the brake pedal 58 is subsequently caught by the hooked block 54 before the lock rod set 18 is pulled to cause the bottom of the brake pedal 58 to rest against the outer side of the carrying rod 27. The locking device 32 is turned such that a pin 60 of the locking device 32 is inserted into a circular slot 62 of the toothed portion 52, as shown in FIGS. 5 and 6. The lock rod set 18 is thus fastened securely with carrying member 14. As shown in FIG. 7, the brake pedal 58 is disabled by the lock 10 of the present invention in such a way that the brake pedal 58 is held by the hooked block 54 and the arresting block 34, and that the bottom seat 22 of the support seat 12 is rested on the floor of the interior of the automotive vehicle.

Figure 8:
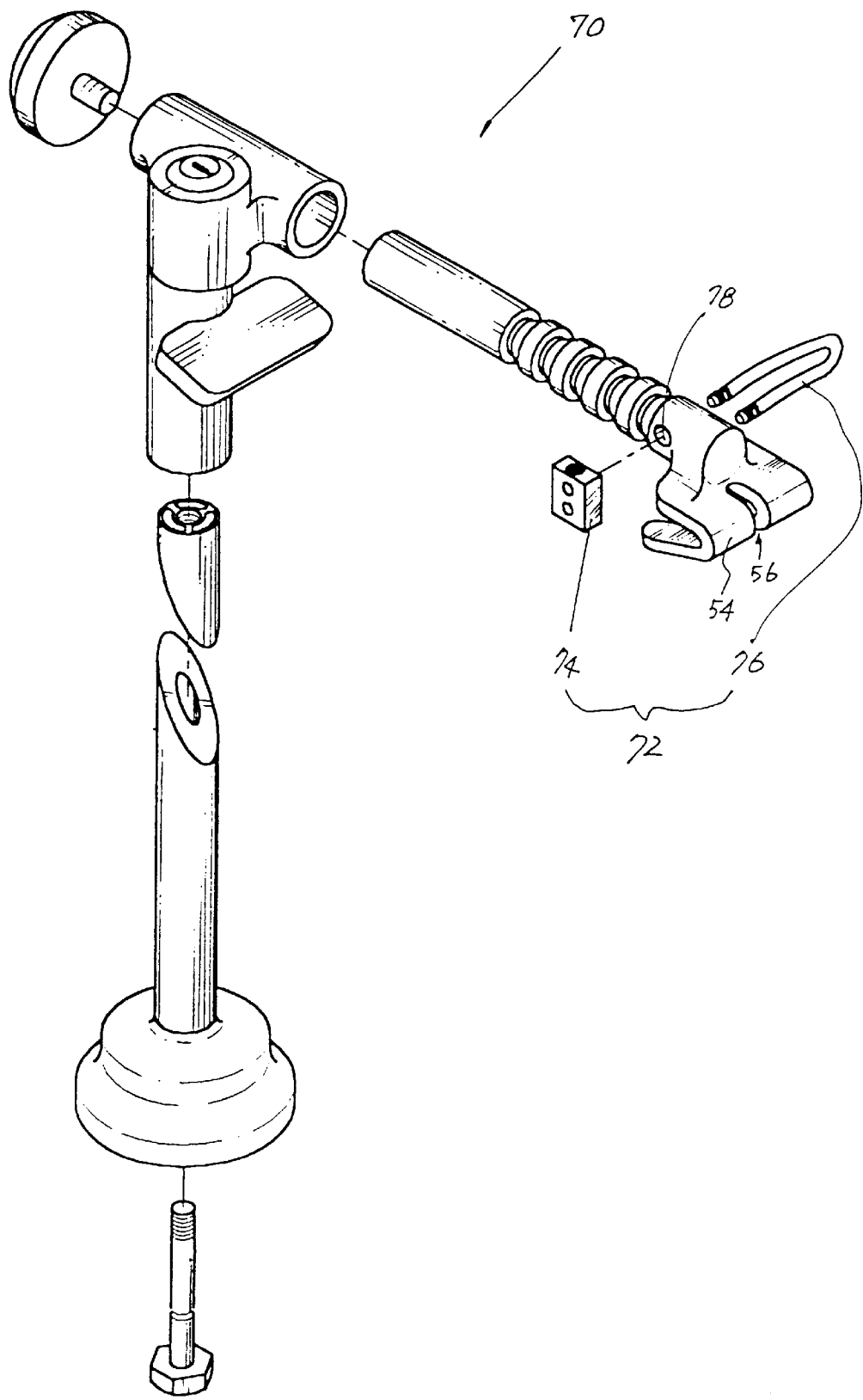
FIG. 8 shows an exploded view of a second preferred embodiment of the present invention.
Figure 9:
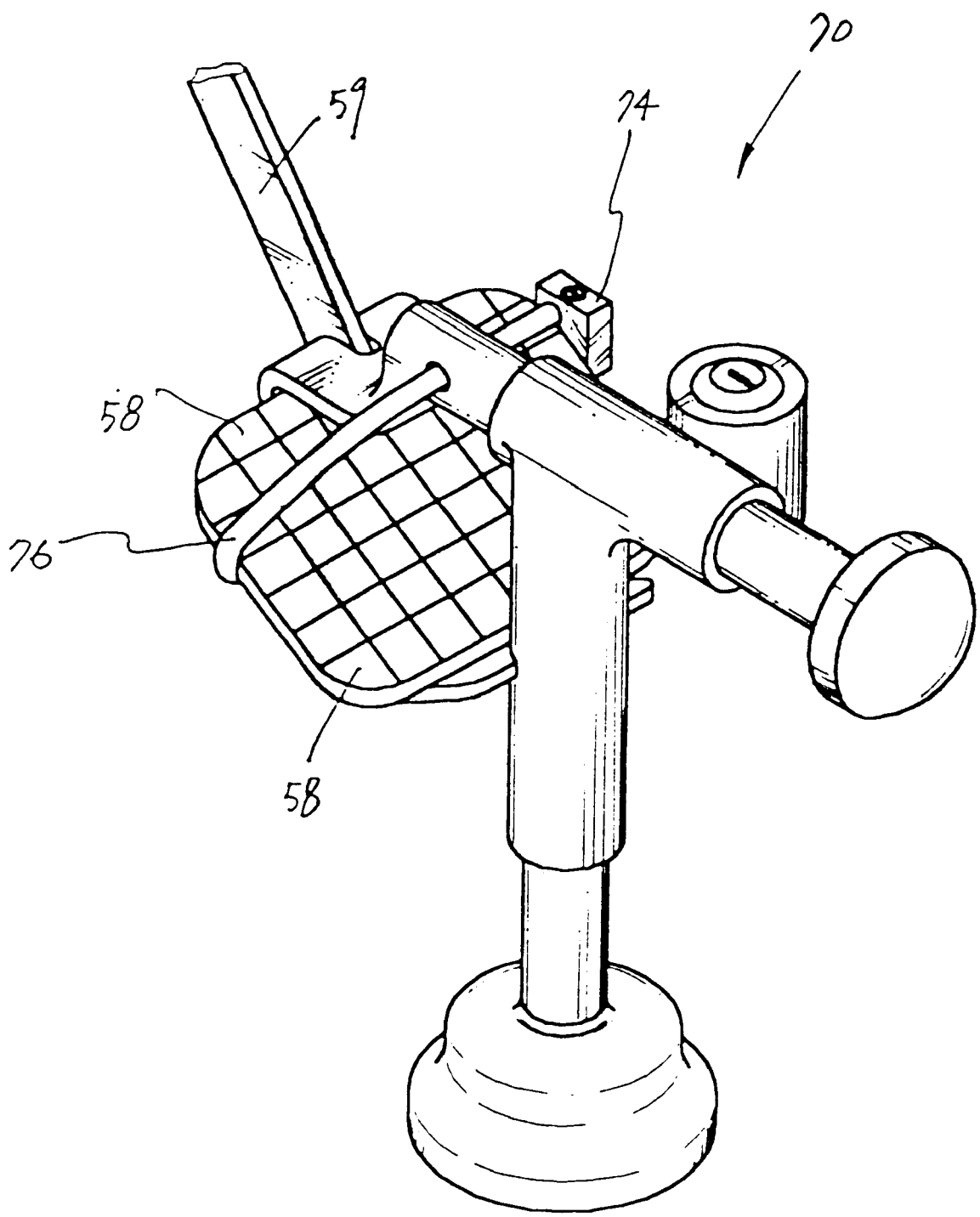
FIG. 9 shows a schematic view of the second preferred embodiment of the present invention at work.

Now referring to FIGS. 8 and 9, a lock 10 of the second preferred embodiment of the present invention is basically similar in construction to that of the first preferred embodiment of the present invention, except that the former further comprises a locking tool 72 which is composed of a locking body 74 and a U-shaped shackle 76 of a metal material. The locking body 74 is provided with two retaining holes for retaining the free ends of both arms of the shackle 76. In operation, the brake pedal 58 is embraced by the shackle 76 such that one arm of the shackle 76 is put through a through hole 78 of the hooked block 54, and that the free ends of both arms of the shackle 76 are retained securely by the locking body 74. The locking tool 72 provides additional disabling effect to give an added protection against the theft of the automotive vehicle.

The embodiments of the present invention described above are to be regarded in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A lock for preventing theft of a motor vehicle, said lock comprising:

a support seat having a bottom seat, and a hollow support rod mounted on said bottom seat;

a carrying member having a carrying rod provided at a bottom thereof with a receiving portion, said carrying member further having a sleeve mounted on a top of said carrying rod, a locking device disposed at one side of said sleeve, and an arresting block disposed at a midsegment of said carrying rod;

a tightening device located in a receiving portion of said support rod for fastening said carrying member with said support rod; and a lock rod set fitted into said sleeve and composed of a lock rod having a shank which is provided at one end thereof with a threaded portion and a hooked block corresponding in location to said arresting block, said lock rod set further composed of a lock member engaged with said one of said shank of said lock rod;

said lock intended to disable one of pedals of the motor vehicle such that one end of one of the pedals is stopped by said arresting block, and that another end of the one of the pedals is retained by said hooked block.

2. The lock as defined in claim 1, wherein said bottom seat is a shell body having an opening facing downward; and wherein said support rod has an interior in communication with an interior of said bottom seat.

3. The lock as defined in claim 2, wherein said tightening device comprises a plug block disposed in said receiving portion such that said plug block is located at a top of said support rod, said tightening device further comprising a locking member fastened with said plug block via said bottom seat and said support rod, said support rod provided at the top thereof with a first contact surface of an inclination, said plug block provided at a bottom thereof with a second contact surface complementary with said first contact surface, whereby said plug block is caused to displace along said first contact surface to press against an inner wall of said carrying rod in conjunction with said support rod at such time when said locking member is rotated.

4. The lock as defined in claim 3, wherein said plug block is provided along an axis thereof with a threaded portion corresponding in location to an interior of said support rod for engaging said locking member.

5. The lock as defined in claim 1, wherein said hooked block is provided with a retaining slot.

6. A lock for preventing theft of a motor vehicle, said lock comprising:

a support seat having a bottom seat, and a hollow support rod mounted on said bottom seat;

a carrying member having a carrying rod provided at a bottom thereof with a receiving portion, said carrying member further having a sleeve mounted on a top of said carrying rod, a locking device disposed at one side of said sleeve, and an arresting block disposed at a midsegment of said carrying rod;

a tightening device located in a receiving portion of said support rod for fastening said carrying member with said support rod;

a lock rod set fitted into said sleeve and composed of a lock rod having a shank which is provided at one end thereof with a toothed portion and a hooked block corresponding in location to said arresting block and having a through hole, said lock rod set further composed of a lock member engaged with another end of said shank of said lock rod; and a locking tool composed of a locking body and a shackle;

said lock intended to disable one of pedals of the motor vehicle such that one end of one of the pedals is stopped by said arresting block, and that another end of the one of the pedals is retained by said hooked block, and further that the one of the pedals is held by said shackle which is put through said through hole of said hooked block and is engaged with said locking body.

* * * * *